US009890753B2

(12) United States Patent
Aritomi et al.

(10) Patent No.: US 9,890,753 B2
(45) Date of Patent: Feb. 13, 2018

(54) HIGH-PRESSURE FUEL SUPPLY PUMP

(71) Applicant: Hitachi Automotive Systems, Ltd., Hitachinaka-shi, Ibaraki (JP)

(72) Inventors: Shunsuke Aritomi, Tokyo (JP); Hitoshi Konno, Hitachinaka (JP); Yukio Takahashi, Hitachinaka (JP); Masayuki Suganami, Hitachinaka (JP); Katsumi Miyazaki, Hitachinaka (JP); Kenichirou Tokuo, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 29 days.

(21) Appl. No.: 14/777,627

(22) PCT Filed: Feb. 3, 2014

(86) PCT No.: PCT/JP2014/052382
§ 371 (c)(1),
(2) Date: Sep. 16, 2015

(87) PCT Pub. No.: WO2014/148125
PCT Pub. Date: Sep. 25, 2014

(65) Prior Publication Data
US 2016/0290299 A1    Oct. 6, 2016

(30) Foreign Application Priority Data
Mar. 19, 2013  (JP) .................................. 2013-055879

(51) Int. Cl.
*F02M 59/46*    (2006.01)
*F02M 59/36*    (2006.01)
(Continued)

(52) U.S. Cl.
CPC ...... *F02M 59/466* (2013.01); *F02M 37/0023* (2013.01); *F02M 59/36* (2013.01);
(Continued)

(58) Field of Classification Search
CPC .... F02M 59/466; F02M 59/464; F02M 59/36; F02M 59/46; F02M 37/0023; F02M 59/367; F16K 31/0644; F16K 31/06
(Continued)

(56) References Cited

U.S. PATENT DOCUMENTS 5,143,345 A * 9/1992 Miki .................... F16K 31/0665
                                                       251/129.02
5,549,274 A * 8/1996 Buchanan ............ F02M 59/466
                                                       251/129.14
(Continued)

FOREIGN PATENT DOCUMENTS

JP    50-131021 B    10/1975
JP    11-63276 A    3/1999
(Continued)

OTHER PUBLICATIONS

International Search Report (PCT/ISA/210) dated Mar. 25, 2014 with English translation (five pages).
(Continued)

*Primary Examiner* — Ian Paquette
(74) *Attorney, Agent, or Firm* — Crowell & Moring LLP

(57) ABSTRACT

It is an object of the present invention to provide an electromagnetic valve structure improved in terms of the responsiveness of the electromagnetic valve and helping to realize a more accurate flow rate control, and to provide a high-pressure fuel supply pump in which the same is mounted. There is provided a high-pressure fuel supply pump having an electromagnetic valve equipped with an electromagnetic coil generating an electromagnetic force for opening and closing a valve body provided between a fuel intake path and a pressure chamber, a movable member operated by the electromagnetic force, a housing accommodating the movable member, and a back-pressure chamber formed between the housing and the movable member,
(Continued)

wherein a first fuel path causing the back-pressure chamber to communicate with the intake path passes the center axis of the movable member.

21 Claims, 4 Drawing Sheets

(51) Int. Cl.
    *F16K 31/06* (2006.01)
    *F02M 37/00* (2006.01)
(52) U.S. Cl.
    CPC .......... *F02M 59/367* (2013.01); *F02M 59/46* (2013.01); *F02M 59/464* (2013.01); *F16K 31/06* (2013.01); *F16K 31/0644* (2013.01)
(58) Field of Classification Search
    USPC ....... 251/48, 50–55, 129.02, 129.07, 129.15, 251/129.21
    See application file for complete search history.

(56) References Cited

U.S. PATENT DOCUMENTS

| | | | |
|---|---|---|---|
| 7,588,229 B2* | 9/2009 | Eiser | B60T 8/363 251/129.02 |
| 7,866,627 B2* | 1/2011 | Ohi | B60T 8/363 251/129.07 |
| 8,328,157 B2* | 12/2012 | Schulz | B60T 8/363 251/129.07 |
| 2010/0276618 A1 | 11/2010 | Schulz et al. | |
| 2012/0093670 A1 | 4/2012 | Usui et al. | |
| 2014/0099215 A1 | 4/2014 | Kawano et al. | |
| 2015/0377376 A1* | 12/2015 | Lappan | F16K 15/18 251/129.15 |

FOREIGN PATENT DOCUMENTS

| | | | |
|---|---|---|---|
| JP | 2003-130247 A | 5/2003 |
| JP | 2004-218633 A | 8/2004 |
| JP | 2010-156258 A | 7/2010 |
| JP | 2010-196589 A | 9/2010 |
| JP | 2012-82810 A | 4/2012 |
| JP | 2012-251447 A | 12/2012 |

OTHER PUBLICATIONS

Japanese Office Action issued in counterpart Japanese Application No. 2015-506637 dated Apr. 7, 2016 with English-language translation (sixteen (16) pages).

Chinese Office Action issued in counterpart Chinese Application No. 201480013555.8 dated Apr. 5, 2017 with English translation (12 pages).

* cited by examiner

[FIG. 1]
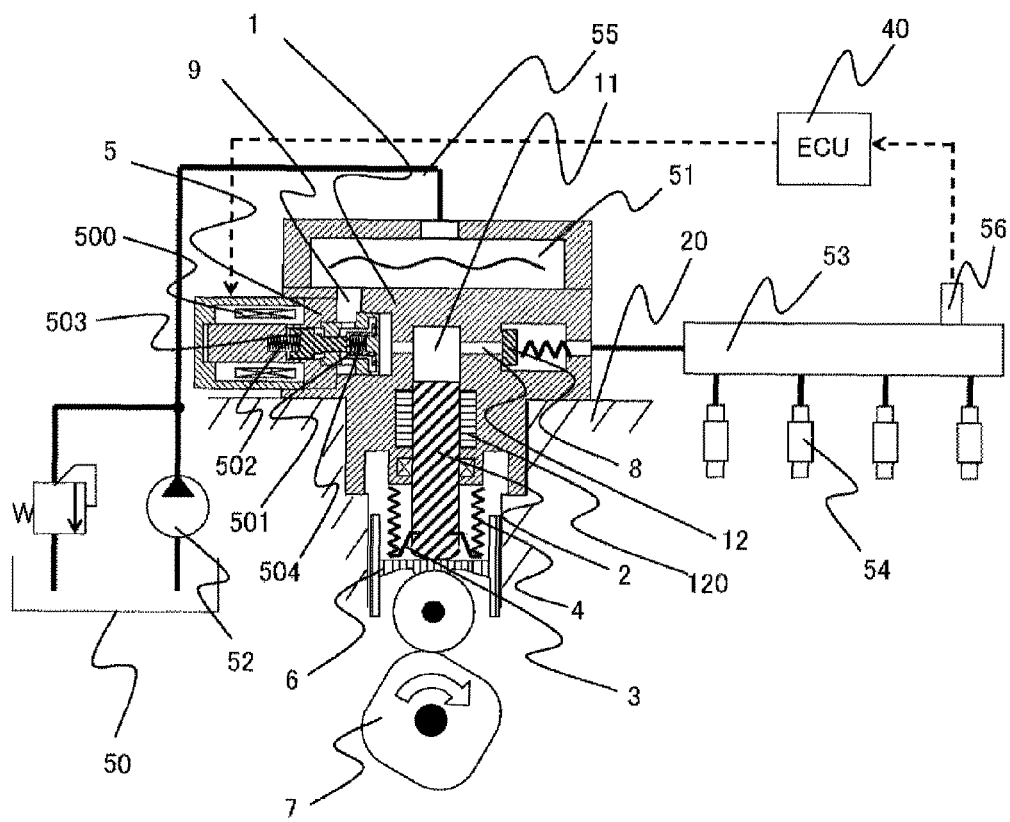

[FIG. 2]
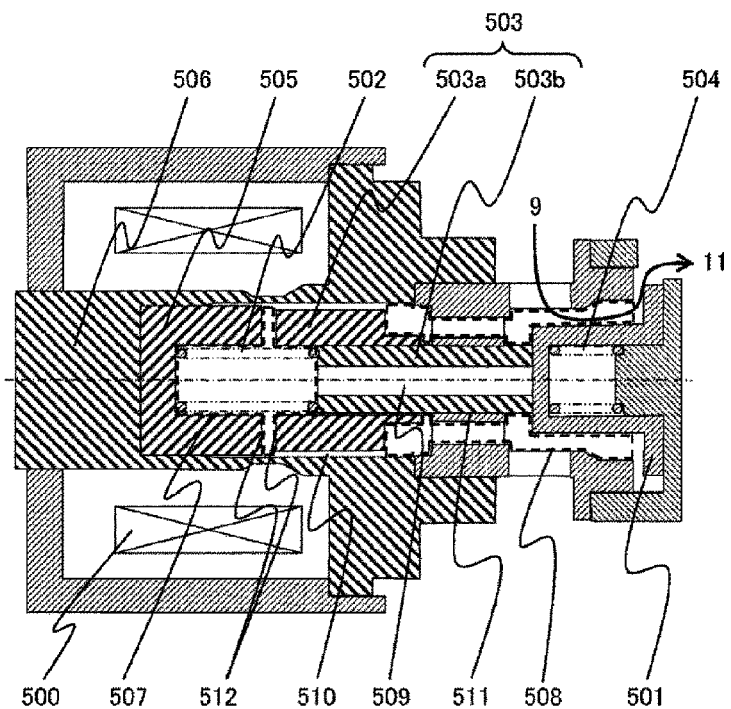
[FIG. 3]
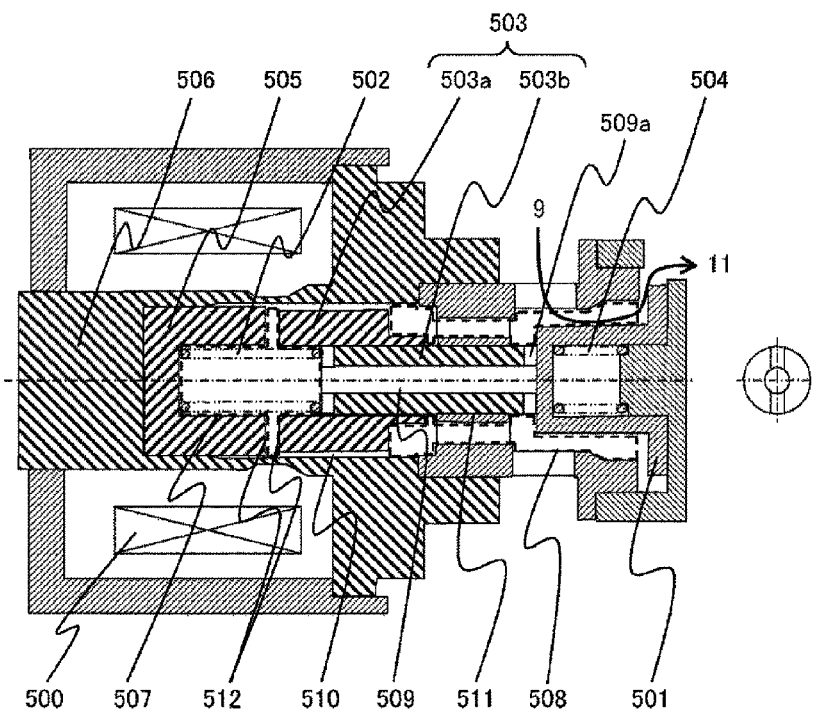

[FIG. 4]
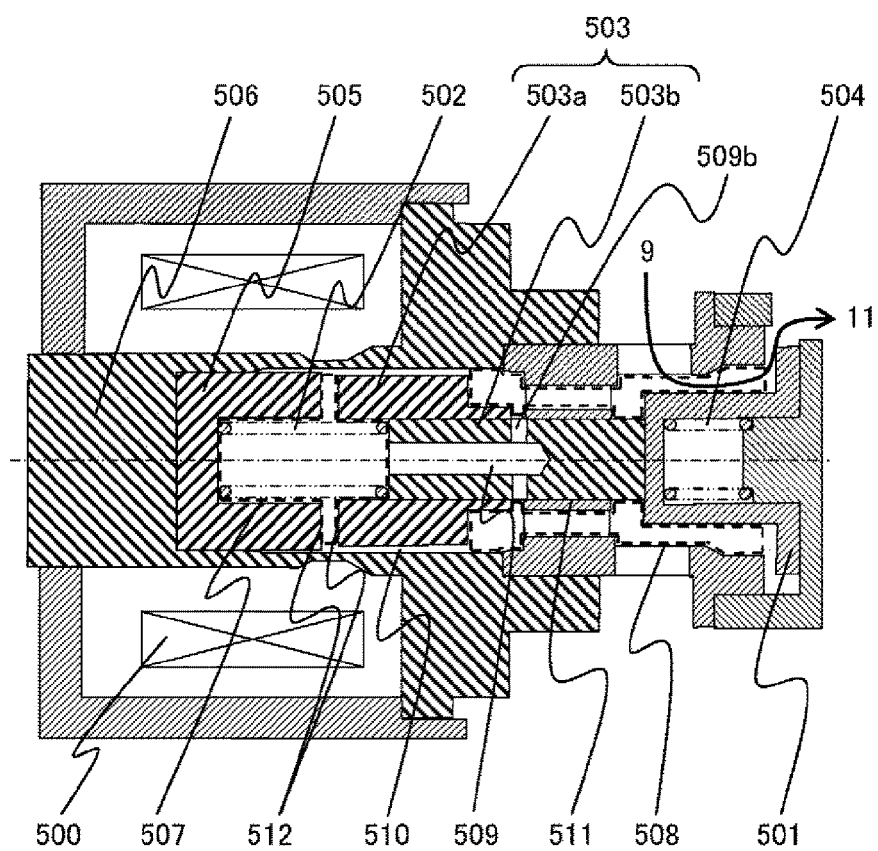

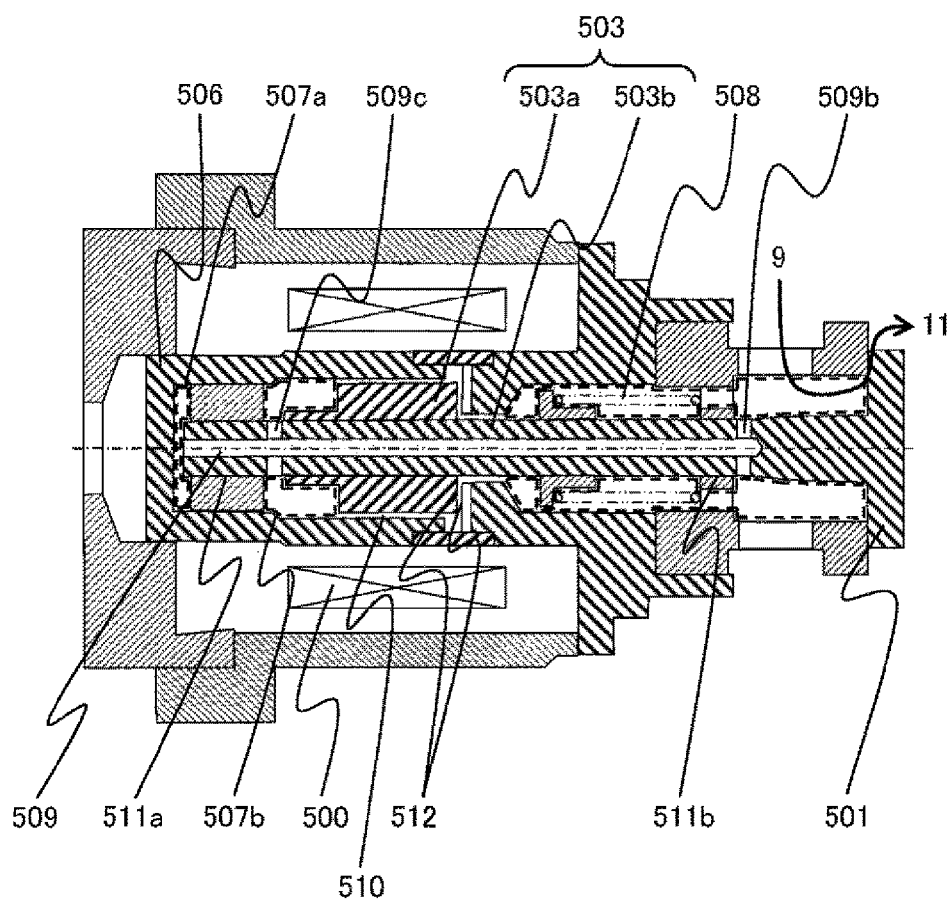
[FIG. 5]

HIGH-PRESSURE FUEL SUPPLY PUMP

TECHNICAL FIELD

The present invention relates to a high-pressure fuel supply pump supplying fuel to an internal combustion engine under high pressure.

BACKGROUND ART

In recent years, in contrast to the port injection type internal combustion engine in which fuel is injected into the intake pipe of the internal combustion engine, there is being developed a direct injection type internal combustion engine in which fuel is directly injected into the cylinder. As is known in the art, by enhancing the pressure of the fuel injected into the cylinder, the atomization and evaporation of the fuel are promoted, and the environmental load is reduced.

To enhance the pressure of the fuel, a plunger type pump is used. By effecting the opening/closing of the admission valve of the pump through electromagnetic driving, the discharge of the pump is adjusted.

Various proposals have been made regarding the fluid path structure in the admission valve (electromagnetic valve) effecting opening/closing through electromagnetic driving. Among them, PTL 1, for example, discloses a structure in which, regarding the electromagnetic valve performing flow rate control on the high-pressure fuel supply pump, there is provided an axial through-hole in the suction surface of the movable member to thereby secure a fluid path.

CITATION LIST

Patent Literature

PTL 1: JP-A-2010-156258

SUMMARY OF INVENTION

Technical Problem

Nowadays, a reduction in size, an increase in output, and an enhancement in efficiency of internal combustion engines are being assiduously put forward. In this connection, regarding the high-pressure fuel supply pump, there is a strong demand for a reduction in body size helping to improve the mountability in an internal combustion engine, an increase in the pressure of discharged fuel in conformity with high output and high efficiency, and a high level of precision in flow rate control. In particular, the high precision in flow rate control is an indispensable item for being in conformity with exhaust regulations, which are becoming more and more strict year by year. For high precision in flow rate control, high responsiveness of the electromagnetic valve controlling the flow rate is necessary, and it is necessary for the movable member of the electromagnetic valve to operate at higher speed in the fluid.

It is an object of the present invention to provide an electromagnetic valve structure improved in terms of the responsiveness of the electromagnetic valve and helping to realize a more accurate flow rate control, and to provide a high-pressure fuel supply pump in which the valve structure is mounted.

Solution to Problem

A high-pressure fuel supply pump including an electromagnetic valve includes an electromagnetic coil generating an electromagnetic force for opening and closing a valve body provided between a fuel intake path and a pressure chamber; a movable member operated by the electromagnetic force; a housing accommodating the movable member; and a back-pressure chamber formed between the housing and the movable member, wherein a first fuel path causing the back-pressure chamber to communicate with the intake path passes the center axis of the movable member.

According to this configuration, it is possible to release the pressure in the back-pressure chamber constituting resistance to the operation of the valve body or the movable member through the first fuel path while maintaining the surface area of the movable member.

When the high-pressure fuel supply pump is configured such that the movable member is formed by an anchor formed of a magnetic material and a rod formed of a non-magnetic material, and a first fluid path is formed in the rod, it is possible to achieve compatibility between the securing of the suction force due to the electromagnetic force and an anti-abrasion property due to the sliding movement of the rod.

When the high-pressure fuel supply pump is configured such that the high-pressure fuel supply pump includes an anchor spring urging the movable member in the valve body opening direction, and a receiving surface of the anchor sprig is formed at an end surface of the rod, with the inner diameter of the spring being larger than the diameter of the fluid path, it is possible to utilize a portion which has conventionally been a dead space as a fluid path.

Advantageous Effects of Invention

The present invention, which is of the construction as described above, provides the following effects.

Since it is possible to release the pressure of the back-pressure chamber constituting resistance to the operation of the valve body, it is possible to provide an electromagnetic valve structure improved in the responsiveness of the electromagnetic valve and capable of realizing an accurate flow rate control, and a high-pressure fuel supply pump in which the same is mounted.

It is possible to realize a high-pressure fuel supply pump in which the electromagnetic valve structure of the present invention is mounted in a small size and in a simple structure.

BRIEF DESCRIPTION OF DRAWINGS

FIG. 1 illustrates the overall construction of a system for carrying out examples 1 through 3.

FIG. 2 is a sectional view of electromagnetic valve peripheral members (at valve-opening position) according to example 1 of the present invention.

FIG. 3 is a sectional view of electromagnetic valve peripheral members (at valve-opening position) according to example 2 of the present invention.

FIG. 4 is a sectional view of electromagnetic valve peripheral members (at valve-opening position) according to example 3 of the present invention.

FIG. 5 is a sectional view of electromagnetic valve peripheral members (at valve-closing position) according to example 3 of the present invention.

DESCRIPTION OF EMBODIMENTS

In the following, embodiments of the present invention will be described with reference to the drawings.

EXAMPLE 1

FIG. 1 shows the overall construction of a system for carrying out examples 1 through 3 of the present invention. The high-pressure fuel supply pump, into a body 1 of which a plurality of components and mechanisms are integrally incorporated, is mounted to a cylinder head 20 of an internal combustion engine. Formed in the body 1 are an intake path 9, a pressure chamber 11, and a discharge path 12. Provided in the intake path 9 and the discharge path 12 are an electromagnetic valve 5 and a discharge valve 8; the discharge valve 8 is a check valve restricting the circulating direction of the fuel.

A plunger 2 is slidably inserted into a cylinder 120, and a retainer 3 is mounted to the lower end thereof. An urging force of a return spring 4 acts on the retainer 3 downwards as seen in FIG. 1. A tappet 6 reciprocates vertically as seen in FIG. 1 through the rotation of a cam 7 of the internal combustion engine. The plunger 2 is displaced in conformity with the tappet 6, whereby the volume of the pressure chamber 11 is varied, making it possible to perform pump operation.

An electromagnetic valve 5 is retained by the body 1; an electromagnetic coil 500, a movable member 503, an anchor spring 502, and a valve body spring 504 are arranged therein. While in the following description it is presupposed that the movable member 503 consists of a single member, it is possible to carry out examples 1 through 3 also in the case where the movable member 503 is formed by two members of an anchor 503*a* forming a suction surface and a rod 503*b* forming a sliding portion. Further, also regarding the valve body 501 and the movable member 503, the following description is given on the assumption that they are separate members; however, in example 3, it is possible to achieve the same effect even if it is presupposed that the two are formed as an integral member.

In the following description, it is presupposed that the system adopts a normal open type electromagnetic valve. The electromagnetic valve system in which the valve is open when the electromagnetic coil 500 is OFF (non-energized state) and in which the valve is closed when the coil is ON is referred to as the normal open system. The urging force of the anchor spring 502 acts on the valve body 501 in the valve opening direction via the movable member 503, and, similarly, the urging force of the valve body spring 504 acts in the valve closing direction. Here, the urging force of the anchor spring 502 is larger than the urging force of the valve body spring 504, so that, when the electromagnetic coil 500 is OFF (non-energized), the valve body 501 is open. On the other hand, it is similarly possible to carry out examples 1 through 3 even when there is presupposed a system using the electromagnetic valve system called the normal close system in which when the operation is reversed, that is, when the electromagnetic coil 500 is OFF (non-energized), the valve body 501 is closed.

In the high-pressure fuel supply pump, fuel sucked up from a fuel tank 50 by a low-pressure fuel pump 52 is supplied through a fuel supply path 55.

Further, the high-pressure fuel supply pump is connected to a common rail 53, feeding fuel increased in pressure. After this, the high-pressure fuel is injected into the cylinders of the internal combustion engine from injectors 54. The pressure in the common rail 53 is measured by a pressure sensor 56, and a signal thereof is transmitted to an engine control unit (ECU). The injectors 54 are mounted in conformity with the number of cylinders of the engine, and inject fuel upon the signal from the engine control unit (ECU) 40.

The operation of the system constructed as described above will be described.

The state in which the plunger 2 has been displaced downwards in FIG. 1 through the rotation of the cam 7 of the internal combustion engine will be referred to as the intake stroke, and the state in which it has been displaced upwards will be referred to as the compression stroke. In the intake stroke, the volume of a pressure chamber 11 increases, and the pressure of the fuel therein decreases. When, in this stroke, the fuel pressure in the pressure chamber 11 becomes lower than the fuel pressure in the intake path 9, the valve body 501 opens, and fuel is sucked into the pressure chamber 11.

In this process, the urging force of the anchor spring 502 acts on the valve body 501 via the movable member 503, so that even when the plunger 2 undergoes transition from the intake stroke to the compression stroke, the valve body 501 still maintains the open state. Thus, also during the compression stroke, the pressure in the pressure chamber 11 is maintained at a low-pressure state substantially equivalent to that of the intake path 9, so that it is impossible to open the discharge valve 8, and the fuel corresponding to the reduction in the volume of the pressure chamber 11 passes the electromagnetic valve 5, and is returned to the damper chamber 51 side. This stroke is referred to as the return stroke.

When, in the return stroke, the electromagnetic coil 500 is energized, an electromagnetic attraction force is applied to the movable member 503, and the movable member 503 moves in the valve closing direction against the urging force of the anchor spring 502. And, the valve body 501 is closed due to the urging force of the valve body spring 504 and the fluid differential pressure force of the return fuel. Then, immediately after this, the fuel pressure in the pressure chamber 11 increases along with the rise of the plunger 2. As a result, the discharge valve 8 is automatically opened, and fuel is supplied to the common rail 53 under pressure.

When the electromagnetic valve 5 operating as described above is used, by adjusting the timing with which the electromagnetic coil 500 is placed in the ON state, it is possible to control the flow rate of the fuel discharged by the pump.

FIG. 2 is a sectional view of the portion around the electromagnetic valve 5 according to example 1 of the present invention. In FIG. 2, numeral 502 indicates the anchor spring, numeral 503*a* indicates the anchor, numeral 503*b* indicates the rod, numeral 505 indicates a stationary member, numeral 506 indicates a housing, numeral 507 indicates a back-pressure chamber, and numeral 508 indicates an intermediate chamber. The members 503*a* and 503*b* are integrated with each other to form the movable member 503.

FIG. 2 shows the normal open type electromagnetic valve in the state in which the coil 500 is not energized, i.e., the open state. The stationary member 505 is fixed to the housing 506, and the movable member 503 is arranged, with the suction surface 512 interposed therebetween. Between the stationary member 505 and the movable member 503, there is arranged the anchor spring 502, urging the movable member 503 in the direction opposite to the suction surface 512. Between the inner side of the anchor spring 502 and the suction surface 512, there is formed the back-pressure chamber 507, the volume of which increases and decreases through the operation of the movable member 503. More specifically, when, at the time of energization, the movable member 503 moves to the stationary member 505 side, the volume of the back-pressure chamber 507 decreases; after this, this is reversed when transition to non-energization is effected. To compensate for this fluctuation in volume, it is necessary to provide a fuel path through which fuel is caused to enter and leave the intermediate chamber 508 connected to the intake path 9 from the back-pressure chamber 507. In view of this, conventionally, there has been provided an annular gap between the outer periphery of the movable member 503 and the inner periphery of the housing 506, with the gap being used as the fuel path. However, the outer periphery 503 of the movable member also serves as the magnetic circuit, so that, when the gap width increases, the magnetic resistance increases, resulting in a reduction in attraction force. Thus, there is a restriction to the gap width secured; to further improve the responsiveness of the movable member, it is necessary to further secure the fluid path. In view of this, in the present example, there is provided an axial through-hole passing the center axis of the movable member 503 not forming the magnetic circuit. At the time of non-energization, the valve opening direction side end surface of the movable member 503 is urged toward the valve body 501, whereas when, at the time of energization, the movable member 503 is rapidly attracted, the urging force thereof is weakened, and a gap is formed between itself and the valve body 501. As a result, it is possible for fuel to flow from the back-pressure chamber 507 to the intermediate chamber 508. In the following, the fuel path passing the center axis of the movable member will be referred to as the first fuel path 509, and the fuel path provided in the outer periphery of the movable member 503 will be referred to as the second fuel path 510.

The movable member 503 may be formed by two members: the anchor 503a forming the suction surface 512 and formed of a magnetic material, and the rod 503b forming the sliding portion 511 and formed of a non-magnetic material. Since the attraction force is generated by the still smaller movable member 503, it is common practice to use a magnetic material for the movable member 503; however, a magnetic material is generally of low hardness, and when the sliding portion 511 is formed of such a material, it is difficult to secure the reliability thereof. As described above, by forming each of them by two members, it is possible to realize compatibility between the securing of attraction force and the reliability of the sliding portion with a still smaller, low-cost structure. When forming the movable member 503 of two members, by providing the first fluid path 509 in the rod 503b, it is possible to secure the fluid path without involving an increase in magnetic resistance. Further, on the suction surface 512 side end surface of the rod 503b, there is formed a receiving surface receiving the seat surface of the anchor spring 502, and the hole diameter of the first fuel path 509 is set equivalent to or smaller than the inner diameter of the anchor spring 502. This does not cause the seat surface to close the opening of the first fuel path 509.

To summarize, in the present example, it is possible to utilize the spring inner side space, which has conventionally been a dead space, as the fuel path, so that it is possible to secure a sufficient fuel path while saving space without involving a reduction in magnetic attraction force. As a result, it is possible to enhance the responsiveness of the electromagnetic valve, and to realize a more accurate flow rate control.

EXAMPLE 2

FIG. 3 is a sectional view of the electromagnetic valve 5 according to example 2 of the present invention and of the portions around the same. In FIG. 3, numeral 502 indicates the anchor spring, numeral 503a indicates the anchor, numeral 503b indicates the rod, numeral 505 indicates the stationary member, numeral 506 indicates the housing, numeral 507 indicates the back-pressure chamber, and numeral 508 indicates the intermediate chamber. The components 503a and 503b are integrated with each other to form the movable member 503.

In the present example, the slit 509a is provided in the end surface on the valve opening side of the movable member 503; also when the end surface of the movable member 503 is in contact with the valve body 501, the first fuel path 509 and the intermediate chamber 508 reliably communicate with each other. While in FIG. 3 the slits 509a are provided at two positions on one side, the same effect can be achieved if the slits are provided at one position or three or more positions on one side. It should be noted, however, that the pressure loss when the fuel passes the path is in inverse proportion to the square of the sectional area, so that it is desirable for the sectional area perpendicular to the flow direction of the slit 509a to be larger than at least the sectional area of the first fuel path 509. In the case where a plurality of slits 509a are provided, it is desirable for the sum total of their sectional areas to be larger than the sectional area of the first fuel path 509. On the other hand, an increase in the number and sectional area of the slits 509a results in an increase in machining cost or in a reduction in the contact area with respect to the valve body 501, so that it is necessary to take these into consideration in determining the number and dimensions of the slits 509a.

Further, in the case where the movable member 503 is formed by the two members of the anchor 503a and the rod 503b, the rod 503b is inserted into the anchor 503a after machining the slit 509a in the rod 503b. In this connection, when the slit 509a is machined solely on one side of the rod 503b, it is necessary to distinguish the inserting direction. Thus, in automating the assembly, the determination method is the problem. As a solution to this, a method is available according to which the slits 509a are provided at both ends of the rod 503b as shown in FIG. 3. This eliminates the need to determine the orientation of the rod 503b at the time of assembly, thus easily facilitating the automation of the assembly.

EXAMPLE 3

FIG. 4 is a sectional view of the electromagnetic valve 5 according to example 3 of the present invention and of the portions around the same. In FIG. 4, numeral 502 indicates the anchor spring, numeral 503a indicates the anchor, numeral 503b indicates the rod, numeral 505 indicates the stationary member, numeral 506 indicates the housing, numeral 507 indicates the back-pressure chamber, and numeral 508 indicates the intermediate chamber. The components 503a and 503b are integrated with each other to form the movable member 503.

In the present example, a radial lateral hole 509b is provided in the rod 503b, whereby the first fuel path 509 and the intermediate chamber 508 communicate with each other. This eliminates the need for the first fuel path 509 to penetrate through the rod 503b, and the contact area between the rod 503b and the valve body 501 does not advantageously decrease even if the path sectional area is enlarged. As in example 2, the number of the lateral holes 509b may be singular or plural; it is desirable for the total sectional area to be larger than the sectional area of the first fuel path 509. When, at the time of movement of the movable member 503, the lateral hole 509b portion overlaps the sliding portion 511, there is the possibility of the sliding function being adversely affected. Thus, within the movable range of the movable member 503, it is necessary to determine the arrangement and dimensions such that the lateral hole 509b portion does not overlap the sliding portion 511. From the viewpoint of manufacture, through the formation of a radial through-hole, it is possible to form two paths through one process, so that an improvement in terms of machining efficiency is more to be expected than in the case of the slit 509a.

While in the above description the normal open system and the case where the movable member 503 and the valve body 501 are separate are presupposed, it is possible to achieve the same effect also in the case of the normal close system and in the case where the two members are integrated.

By way of example, FIG. 5 shows a structure in which the normal close system and the case where the movable member 503 and the valve body 501 are integrated with each other are presupposed.

In the structure of FIG. 5, the rod 503b is guided by a first sliding portion 511a and a second sliding portion 511b provided on both sides of the anchor 503a, so that there exist two back-pressure chambers: a first back-pressure chamber 507a and a second back-pressure chamber 507b. There is formed the first fuel path 509 passing the center axis of the rod 503; it communicates with the intermediate chamber 508 via the radial lateral hole 509b. As a result, it is possible to connect the first back-pressure chamber 507a and the intermediate chamber 508. Further, to connect the second back-pressure chamber 507b and the first fuel path 509, there is newly provided a radial lateral hole 509c.

Due to the above construction, without affecting the magnetic circuit, it is possible to connect the two back-pressure chambers 507a and 507b and the intermediate chamber 508. As a problem in manufacture, the rod 503b is of a small outer diameter, so that when machining a deep hole in the axial direction, a high precision machining is required. If, to avoid this, the rod 503b is formed of a pipe material, it is possible to achieve the same effect.

REFERENCE SIGNS LIST

1 ... body, 2 ... plunger, 3 ... retainer, 4 ... return spring, 5 ... electromagnetic valve, 6 ... tappet, 7 ... cam, 8 ... discharge valve, 9 ... intake path, 11 ... pressure chamber, 12 ... discharge path, 20 ... cylinder head, 40 ... ECU, 50 ... fuel tank, 51 ... damper chamber, 52 ... low-pressure fuel supply pump, 53 ... common rail, 54 ... injector, 55 ... fuel supply path, 56 ... pressure sensor, 120 ... cylinder, 500 ... electromagnetic coil, 501 ... valve body, 502 ... anchor spring, 503 ... movable member, 503a ... anchor, 503b ... rod, 504 ... valve body spring, 505 ... stationary member, 506 ... housing, 507 ... back-pressure chamber, 508 ... intermediate chamber, 509 ... first fuel path, 509a ... slit, 509b ... lateral hole, 510 ... second fuel path, 511 ... sliding portion, 511a ... first sliding portion, 512b ... second sliding portion, 512 ... suction surface

The invention claimed is:

1. A high-pressure fuel supply pump comprising:
a fuel intake path;
a pressure chamber; and
an electromagnetic valve equipped with:
an electromagnetic coil configured to generate an electromagnetic force for closing a valve body provided between the fuel intake path and the pressure chamber,
a movable member configured to be operated by the electromagnetic force,
an anchor spring urging the movable member in an opening direction of the valve body,
a housing accommodating the movable member,
a back-pressure chamber formed between the housing and the movable member, wherein the movable member has an anchor and a rod,
a guiding member in which the rod is slidably guided, and
an intermediate chamber provided between the anchor and the guiding member, wherein
the rod is made of a material having greater hardness and greater magnetic resistance than a material of the anchor,
a first fuel path allowing the back-pressure chamber to communicate with the intermediate chamber extends along a center axis of the rod,
a first end of the first fuel path is immediately adjacent to and opens directly into the back-pressure chamber,
a receiving surface for receiving the anchor spring is formed on the back-pressure chamber side end surface of the rod,
a second fuel path allowing the intermediate chamber to communicate with the intake path is provided in the guiding member,
the anchor has a large-diameter portion and a small-diameter portion formed on an intermediate chamber side, and
the intermediate chamber is provided in an outer peripheral side of the small-diameter portion of the anchor.

2. The high-pressure fuel supply pump according to claim 1, wherein the movable member and the valve body are separate from each other.

3. The high-pressure fuel supply pump according to claim 1, wherein the inner diameter of the anchor spring is larger than the inner diameter of the first fluid path.

4. The high-pressure fuel supply pump according to claim 1, further comprising a recess portion that is formed on an anchor side of the guiding member, wherein the intermediate chamber is immediately adjacent to the recess portion.

5. The high-pressure fuel supply pump according to claim 4, wherein in a valve opening state, a valve body side end portion of the small-diameter portion of the anchor is protruded into the recess portion of the guiding member.

6. The high-pressure fuel supply pump according to claim 1, wherein the first fluid path communicates with the fuel intake path via a radial slit or hole formed in the movable member.

7. The high-pressure fuel supply pump according to claim 6, wherein a sum total of the sectional areas perpendicular to the flow direction of the slit or the lateral hole are larger than a sectional area of the first fluid path.

8. The high-pressure fuel supply pump according to claim 6, wherein sectional areas perpendicular to the flow direction of the slit or the lateral hole are larger than a sectional area of the first fluid path.

9. The high-pressure fuel supply pump according to claim 1, wherein the intermediate chamber accommodating the valve body is provided between the pressure chamber and the fuel intake path.

10. The high-pressure fuel supply pump according to claim 9, wherein the back-pressure chamber and the intake path are connected by the first fluid path and the second fluid path provided at a peripheral edge portion of the movable member via the intermediate chamber.

11. The high-pressure fuel supply pump according to claim 10, wherein an entire sectional area of the second fluid path is larger than an entire sectional area of the first fluid path.

12. A high-pressure fuel supply pump comprising:
a fuel intake path;
a pressure chamber; and
an electromagnetic valve equipped with:
an electromagnetic coil configured to generate an electromagnetic force for closing a valve body provided between the fuel intake path and the pressure chamber,
a movable member configured to be operated by the electromagnetic force,
an anchor spring urging the movable member in an opening direction of the valve body,
a housing accommodating the movable member,
a back-pressure chamber formed between the housing and the movable member, wherein the movable member has an anchor and a rod,
a guiding member in which the rod is slidably guided, and
an intermediate chamber provided between the anchor and the guiding member, wherein
the rod is made of a material having greater hardness and greater magnetic resistance than a material of the anchor,
a first fuel path allowing the back-pressure chamber to communicate with the intermediate chamber extends along a center axis of the rod,
a first end of the first fuel path is immediately adjacent to and opens directly into the back-pressure chamber,
a receiving surface for receiving the anchor spring is formed on the back-pressure chamber side end surface of the rod,
a second fuel path allowing the intermediate chamber to communicate with the intake path is provided in the guiding member,
the anchor has a large-diameter portion and a small-diameter portion formed on an intermediate chamber side, and
the intermediate chamber is provided in an outer peripheral side of the small-diameter portion of the anchor.

13. The high-pressure fuel supply pump according to claim 12, wherein the movable member and the valve body are separate from each other.

14. The high-pressure fuel supply pump according to claim 12, further comprising a recess portion that is formed on an anchor side of the guiding member, wherein the intermediate chamber is immediately adjacent to the recess portion.

15. The high-pressure fuel supply pump according to claim 14, wherein in a valve opening state, a valve body side end portion of the small-diameter portion of the anchor is protruded into the recess portion of the guiding member.

16. The high-pressure fuel supply pump according to claim 12, wherein the first fluid path communicates with the fuel intake path via a radial slit or hole formed in the movable member.

17. The high-pressure fuel supply pump according to claim 16, wherein a sum total of sectional areas perpendicular to the flow direction of the slit or the lateral hole are larger than a sectional area of the first fluid path.

18. The high-pressure fuel supply pump according to claim 16, wherein sectional areas perpendicular to the flow direction of the slit or the lateral hole are larger than a sectional area of the first fluid path.

19. The high-pressure fuel supply pump according to claim 12, wherein the intermediate chamber accommodating the valve body is provided between the pressure chamber and the fuel intake path.

20. The high-pressure fuel supply pump according to claim 19, wherein the back-pressure chamber and the intake path are connected by the first fluid path and a second fluid path provided at the peripheral edge portion of the movable member via the intermediate chamber.

21. The high-pressure fuel supply pump according to claim 20, wherein an entire sectional area of the second fluid path is larger than an entire sectional area of the first fluid path.

* * * * *